United States Patent [19]

Chatman et al.

[11] Patent Number: 4,936,426
[45] Date of Patent: Jun. 26, 1990

[54] BRAKE ASSEMBLY

[75] Inventors: Weeden Chatman; Than Naing, both of Montgomery, Ala.

[73] Assignee: Dana Corporation, Toledo, Ohio

[21] Appl. No.: 750,225

[22] Filed: Jun. 28, 1985

Related U.S. Application Data

[63] Continuation of Ser. No. 676,598, Nov. 30, 1984, abandoned, which is a continuation of Ser. No. 493,754, May 11, 1983, abandoned, which is a continuation of Ser. No. 450,098, Dec. 15, 1982, abandoned, which is a continuation of Ser. No. 171,037, Jul. 21, 1980, abandoned.

[51] Int. Cl.$^5$ ............................................. F16D 51/22
[52] U.S. Cl. ................................ 188/330; 188/341; 188/250 C; 188/250 F; 192/75
[58] Field of Search ............... 188/341, 327, 328, 329, 188/250 C, 250 F, 216; 192/75, 107 T; 411/530

[56] References Cited

U.S. PATENT DOCUMENTS

| | | | |
|---|---|---|---|
| 1,385,482 | 7/1921 | Carter | 188/106 R |
| 1,397,225 | 11/1921 | Michaud | 188/341 X |
| 1,478,969 | 12/1923 | Leitzell | 188/328 |
| 2,710,076 | 6/1955 | Russell | 188/330 |
| 2,781,868 | 2/1957 | House | 188/330 |
| 2,965,199 | 12/1960 | Raden | 188/341 |
| 3,283,858 | 11/1966 | Mossey et al. | 188/341 |
| 3,367,458 | 2/1968 | Self et al. | 188/330 X |
| 3,400,787 | 9/1968 | Keller et al. | 188/106 R |
| 4,017,337 | 4/1977 | Winter et al. | 24/265 PC |
| 4,206,834 | 6/1980 | Williams | 188/341 |
| 4,372,430 | 2/1983 | Borugian | 188/329 |

FOREIGN PATENT DOCUMENTS

| | | | |
|---|---|---|---|
| 1379 | 6/1978 | European Pat. Off. | |
| 343365 | 11/1921 | Fed. Rep. of Germany | 411/530 |
| 1198947 | 6/1959 | France | 188/329 |
| 26986 | 11/1964 | German Democratic Rep. | 411/530 |
| 2013800 | 8/1929 | United Kingdom | |

Primary Examiner—George E. A. Halvosa
Attorney, Agent, or Firm—Lalos & Keegan

[57] ABSTRACT

A brake assembly, for a vehicle axle having a beam, including a spider mounted on the beam, a camshaft mounted on one end of the spider, a pair of anchor pins mounted on an opposite end of the spider, and a pair of brake shoes. Each of the brake shoes has at least one bearing surface disposed at one end thereof mounted on an outer portion of one of the anchor pins and a roller mounted on an opposite end thereof operatively engageable with the camshaft. A spring interconnects upper portions of the brake shoes and pivotally biases the upper ends of the brake shoes toward each other into retracted positions. A retainer adjacent the anchor pin ends of the brake shoes biasingly urges the bearing surfaces of the brake shoes into engagement with the anchor pins. The retainer is a U-shaped spring element having a hook section at each of its free ends encompassing the anchor pin ends of the brake shoes. The retainer includes a base section engaging an anchor pin end portion of one of the brake shoes and a pair of leg sections projecting from end portions of the base section toward the other of the brake shoes. The hook sections are disposed at the free ends of the leg sections and engage the other one of the brake shoes in hooking relation. Portions of the leg sections of the U-shaped retainer engage both ends of the anchor pins thereby preventing their axial movement.

17 Claims, 3 Drawing Sheets

BRAKE ASSEMBLY

This application is a continuation of application, Ser. No. 676,598, filed Nov. 30, 1984, now abandoned, which was a continuation of application, Ser. No. 493,754, filed May 11, 1983, now abandoned, which was a continuation of application, Ser. No. 450,098, filed Dec. 15, 1982, now abandoned, which was a continuation of application, Ser. No. 171,037, filed July 21, 1980, now abandoned.

This invention relates to a brake assembly and more particularly to an improved brake assembly for trailer axles, of the foundation type. This invention further contemplates an improved brake shoe and a novel brake shoe retainer for such a brake assembly.

Brake assemblies of the foundation type generally consist of a brake spider mounted on an axle beam, a pair of anchor pins mounted at one end of the brake spider, a camshaft mounted on an opposite end of the brake spider, a pair of brake shoes pivotally mounted at one set of ends thereof on the anchor pins and engageable at the opposite set of ends thereof with a cam portion of the camshaft, and a retracting springs operatively interconnecting the brake shoes, pivotally biasing the brake shoes together into yielding engagement with the cam portion of the camshaft.

In such type of assembly, it has been the conventional practice in the prior art to mount the brake shoes on the anchor pins by forming the lower ends of the rib portions of the brake shoes with openings for receiving the anchor pins. Such an arrangement, however, has been found to be undesirable in that considerable time and effort is required to disassemble a brake unit during normal maintenance and servicing operations. More recently, it has become the practice in the industry to fabricate the brake shoes with arcuate bearing surfaces in lieu of mounting holes, which are seated on the anchor pins for mounting the brake shoes on the brake spider. Such bearing surfaces are maintained in engagement with the anchor pins by means of retainer springs. While such a design has provided some improvement in such assemblies, it has been found that such design is not sufficiently satisfactory from the viewpoint of simplicity of design, reliability and effectiveness in performance and ease of maintenance and servicing.

Accordingly, it is the principal object of the present invention to provide an improved brake assembly.

Another object of the present invention is to provide an improved brake assembly for trailer axles.

A further object of the present invention is to provide an improved brake assembly for trailer axles, of the foundation type.

A still further object of the present invention is to provide an improved brake assembly for trailer axles, providing an increased service life of the components thereof.

Another object of the present invention is to provide an improved brake assembly for trailer axles, of the foundation type, which is simple in design, reliable and effective in performance and adapted to facilitate maintenance and servicing.

A further object of the present invention is to provide an improved brake shoe design for a brake assembly of the foundation type.

A still further object of the present invention is to provide a novel retainer for the brake shoes of a foundation type of brake assembly.

Other objects and advantages of the present invention will become more apparent to those persons having ordinary skill in the art to which the present invention pertains from the following description taken in conjunction with the accompanying drawings in which.

Figure 1:
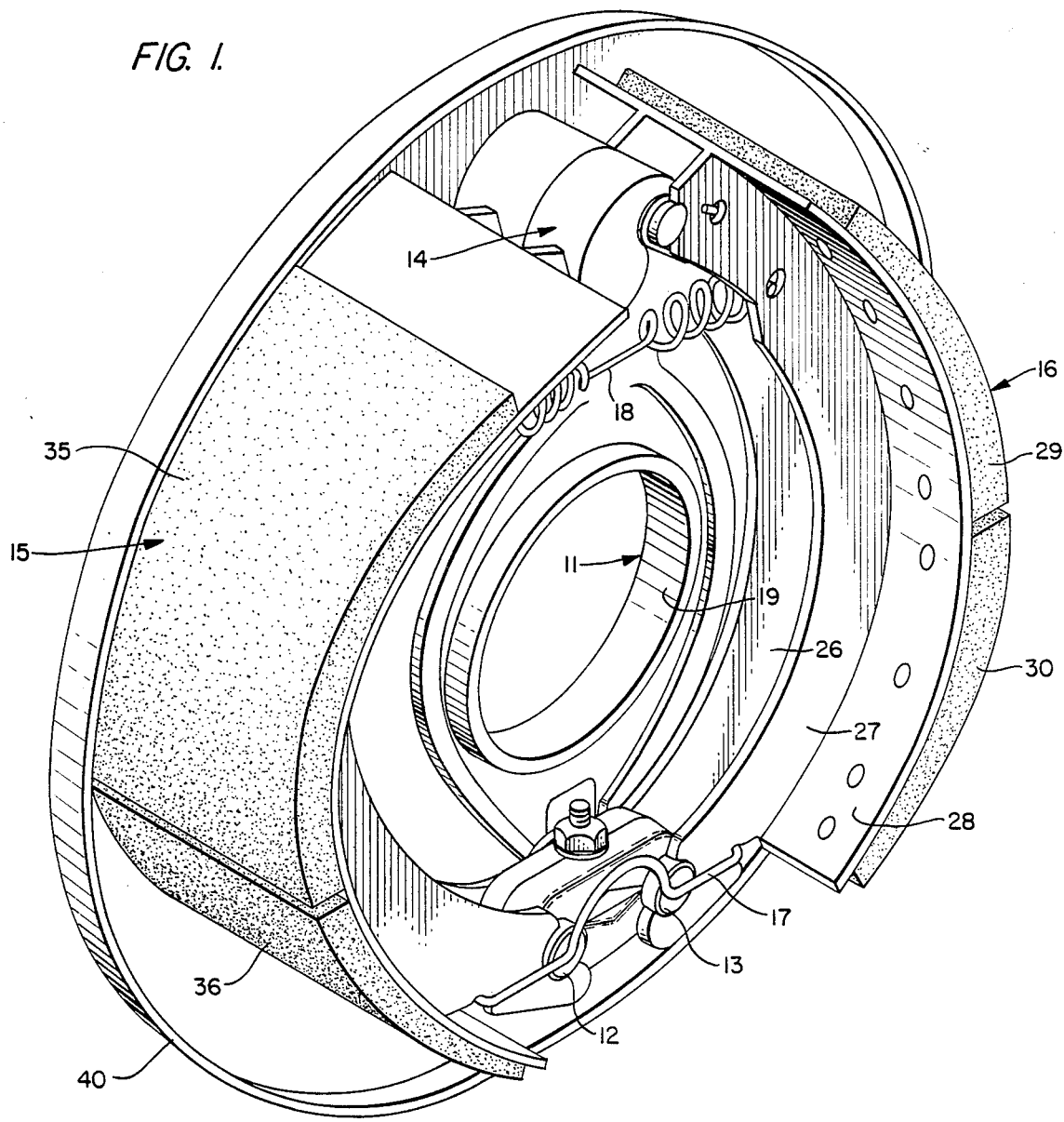
FIG. 1 is a perspective view of a brake assembly for a trailer axle, embodying the present invention.

Referring to the drawings, there is illustrated a brake assembly 10, of the foundation type, for a trailer axle, which embodies the present invention. Generally, the assembly consists of a brake spider 11, a set of anchor pins 12 and 13 mounted on one end of the brake spider, a camshaft 14 mounted on the other end of the brake spider, a pair of brake shoes 15 and 16 pivotally mounted at one set of ends on anchor pins 12 and 13 and operatively engaging the camshaft at the other set of ends thereof, a brake shoe retainer 17 and a retracting spring 18.

Brake spider 11 essentially consists of a bracket which is adapted to be mounted on the end of an axle beam adjacent a spindle mounted on the end of the beam. It is provided with a cylindrical center opening 19 through which an end of the axle beam is received, a pair of circular openings 20 and 21 at one end thereof in which anchor pins 12 and 13 are mounted, and an opening in the other end thereof in which the camshaft is mounted. Although not specifically shown in the drawings, the brake spider is adapted to be rigidly secured to the axle beam by bolting the brake spider on an annular flange welded on the axle beam or, preferably, by welding the brake spider directly on the axle beam. Generally, the brake spider functions to support the working components of the brake assembly.

Figure 3:
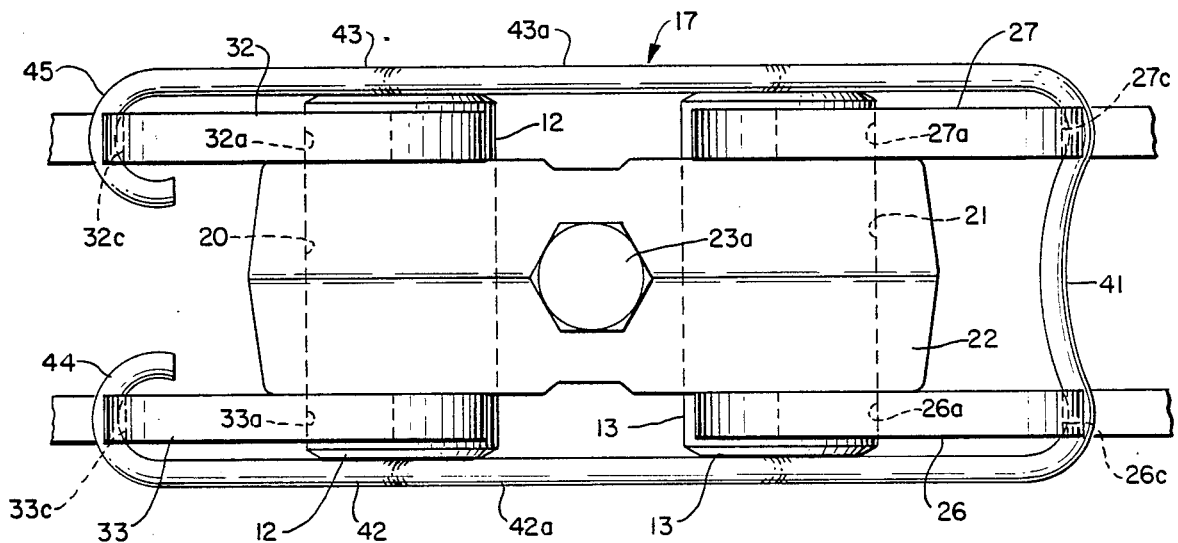
FIG. 3 is an enlarged cross-sectional view taken along line 3—3 in FIG. 2.
Figure 4:
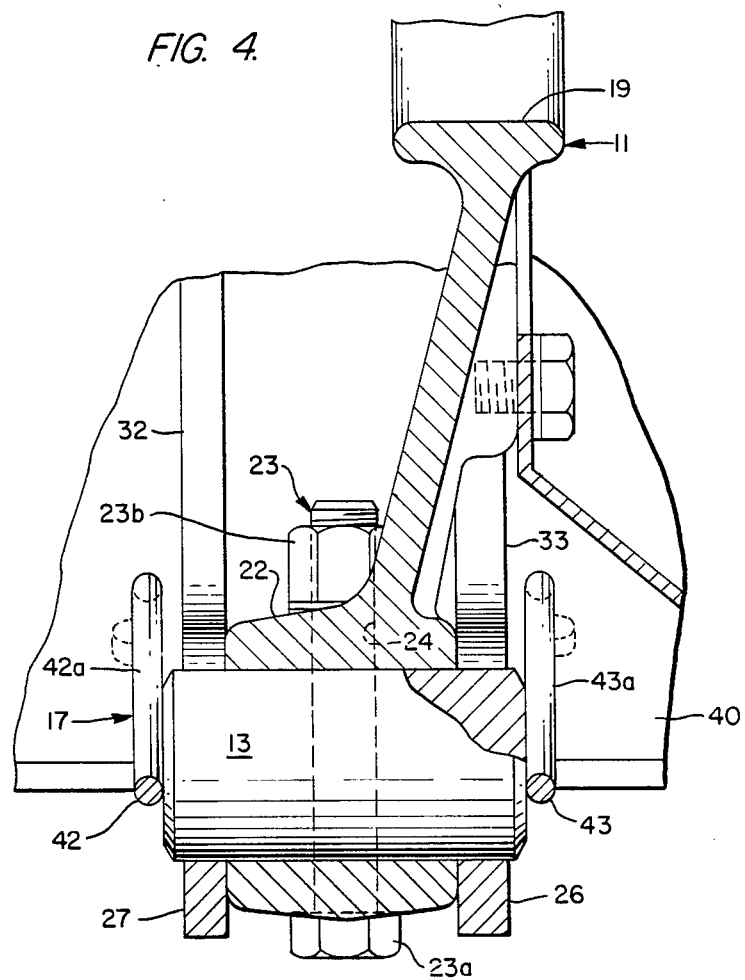
FIG. 4 is an enlarged cross-sectional view taken along line 4—4 in FIG. 2.

As best shown in FIGS. 3 and 4, the one end 22 of the brake spider providing anchor pin holes 20 and 21 is formed with an enlarged longitudinal dimension to accommodate anchor pins 12 and 13. A section of such enlarged end between anchor pin holes 20 and 21 is removed so as to allow a minimal amount of flexing of the lower portion of section 22 relative to the upper portion thereof to facilitate the insertion and removal of anchor pins 12 and 13. When the anchor pins are mounted in anchor pin holes 20 and 21, they may be retained firmly in position by means of a fastener 23 including a bolt 23a inserted through the underside of a bolt hole 24 in enlarged section 22, between anchor pin holes 20 and 21, and a nut 23b threaded on the end of bolt 23a and tightened against an inner surface of enlarged section 22. As shown in FIGS. 3 and 4, the lengths of anchor pins 12 and 13 are slightly greater than the lengths of anchor pin holes 20 and 21 so that the end portions of the anchor pins project outwardly of the end surfaces of enlarged section 22 to accommodate the mounting of the brake shoes.

Camshaft 14 consists of a shaft having an S-shaped cam portion 25 mounted on an outer end thereof. The shaft is disposed substantially parallel to the axis of the axle beam. It is supported at an inner end in a conventional slack adjuster mounted on the axle beam and is supported at its outer end in an opening provided in the brake spider. The camshaft is adapted to be rotated about its axis by means of an air cylinder mounted on the axle beam and operatively connected to the slack adjuster.

Figure 2:
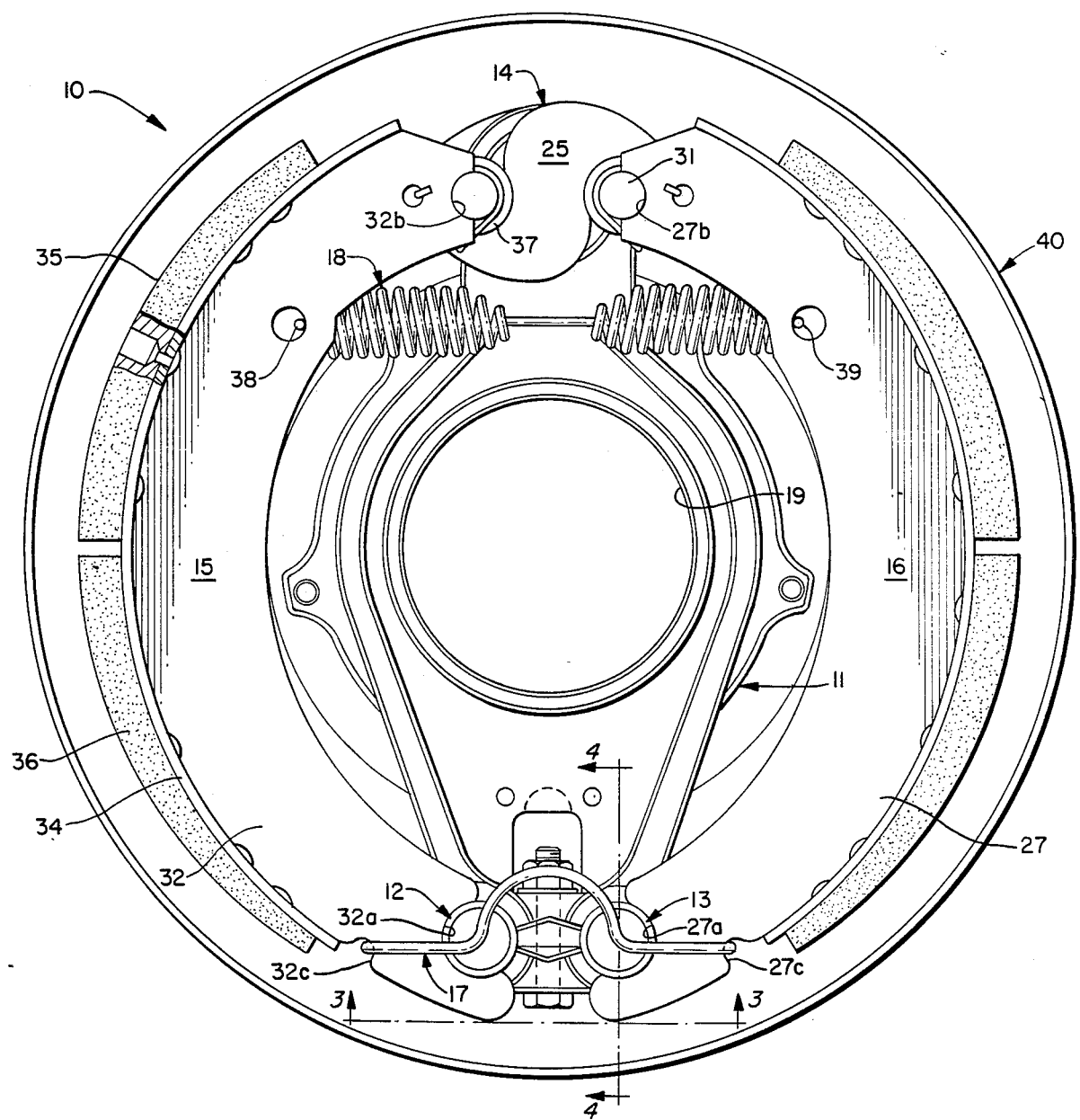
FIG. 2 is a front elevational view of the brake assembly shown in FIG. 1.

Brake shoes 15 and 16 are substantially similar in construction. As best shown in FIGS. 1 and 2, brake shoe 16 includes a pair of arcuately shaped rib sections 26 and 27, a table section 28 and a set of tapered linings 29 and 30. The rib sections are substantially similar in configuration and are provided with arcuate bearing surfaces 26a and 27a at one set of ends thereof which are adapted to engage an outer surface of anchor pin 13, and a set of arcuate bearing surface 27b at an opposite set of ends thereof on which there is seated a roller 31 which engages the cam surface of cam portion 26 of the camshaft. The outer edges of rib sections 26 and 27, at the anchor pin ends thereof, are provided with a pair of aligned notches 26c and 27c for accommodating retainer 17 as will later be described.

Table section 28 also is arcuately shaped and is mounted on the outer arcuate edges of rib sections 26 and 27, usually by welding. Linings 29 and 30 are mounted on the outer surface of table section 28 by rivets in the conventional manner.

Brake shoe 15 similarly consists of a set of rib sections 32 and 33, a table section 34 and a set of linings 35 and 36. The anchor pin ends of rib sections 32 and 33 are provided with arcuately shaped bearing contact surfaces 32a and 33a which engage an outer portion of anchor pin 12. The cam end of rib sections 32 and 33 are provided with a set of arcuately shaped seating surface 32b on which there is seated a roller 37 which engages cam portion 25 of the camshaft The outer edges of the rib sections, at the anchor pin ends thereof, are provided with a set of aligned notches 32c and 33c also for accommodating retainer 17 as will later be described.

Table section 34 also is rigidly secured to the outer edges of the rib sections, usually by welding, and linings 35 and 36 are mounted on the outer surface of the table section by means of rivets, in the conventional manner.

Retracting spring 18 is connected at the ends thereof to a set of pins 38 and 39 provided on the rib sections of the brake shoes. The retracting spring functions to pivotally bias the brake shoes inwardly about the anchor pins so that rollers 31 and 37 firmly engage cam portion 25 of the camshaft, in the conventional manner. It will be appreciated that by operating the air chamber of the axle assembly, the camshaft will be rotated to turn the cam portion of the shaft and pivot the brake shoes outwardly so that the brake linings will engage the brake drum 40.

Figure 5:
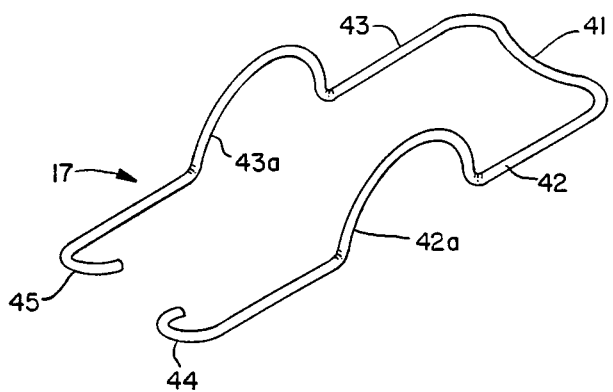
FIG. 5 is a perspective view of the brake shoe retainer utilized in the assembly shown in FIGS. 1 and 2.

Referring to FIG. 5, it will be seen that retainer 17 consists of a continuous strand of spring steel and includes a base section 41, a pair of leg sections 42 and 43 provided with arcuate portions 42a and 43a, respectively, and a pair of inwardly turned hook sections 44 and 45. Base section 41, leg sections 42 and 43 and hook portions 44 and 45 lie in substantially the same plane. Arcuate portions 42a and 43a lie in parallel planes disposed substantially perpendicular to the plane of the base, leg and hook sections. When the retainer is mounted in the brake assembly in its assembled condition, as shown in the drawings, base section 41 will be received in notches 26c and 27c, leg sections 42 and 43 will project along the anchor pin ends of rib sections 26 and 27 of brake shoe 16, the end surfaces of anchor pins 12 and 13 and the anchor pin ends of rib sections 32 and 33 of brake shoe 15, and hook sections 44 and 45 will be received within notches 32c and 33c of rib sections 32 and 33 of brake shoe 15, in hooking relation. As best shown in FIG. 2, the base, leg and hook sections of the retainer will lie in a base plane substantially including the axes of anchor pins 12 and 13, and the arcuate portions of the leg sections will be disposed between the anchor pins. It particularly is to be noted that the leg sections, including the arcuate portions thereof, engage the end surfaces of the anchor pins to prevent axial displacement of the anchor pins. Such feature is particularly useful in foundation-type brake assemblies similar to the assembly shown in the drawings where the anchor pins are not provided with a clamping arrangement, as previously described.

Although the brake assembly is shown in FIG. 2 with the camshaft in an upper position and the anchor pins in a lower position, when the assembly is installed on an axle mounted on a trailer, the brake will be oriented approximately 112° in a clockwise direction, relative to the position shown in the drawings, so that brake shoe 15 will be disposed on the upper end of the brake and brake shoe 16 will be positioned at the lower end of the brake. To disassemble the brake assembly under such conditions, the hook sections of the retainer are first pried out of notches 32c and 33c of brake shoe 15 to release the anchor pin ends of the shoes. Lower shoe 16 may then be removed by detaching the camshaft end of it from retracting spring 18. Upper shoe 15 is then free to be lifted off of cam portion 25 and anchor pin 12.

With the brake shoes thus removed, the anchor pins may be inspected to determine whether there has been any undue wear. If so, nut 23b of the clamping bolt may be backed off to loosen the anchor pins and permit them to be rotated to provide suitable contact surfaces for the bearing surfaces of the brake shoes. Once the anchor pins have been rotated to the desired positions, nut 23b is turned down to reclamp the anchor pins in the set positions.

Assuming the brake shoes are to be replaced, a replacement brake shoe 15 is positioned in the brake assembly by seating its roller 37 on cam portion 25 and seating bearing surfaces 32a and 33a on anchor pin 12. If not already connected, retracting spring 18 is connected to pin 38 of replacement shoe 15. Replacement shoe 16 is then connected to the other end of retracting spring 18 and roller 31 is permitted to engage cam portion 25 while the opposite end of the lower replacement shoe is permitted to hang below anchor pin 13. The brake assembly is then completed by positioning the base section of a replacement spring in notches 26c and 27c of lower replacement shoe 16, and moving the retainer and anchor pin end of shoe 16 upwardly so that bearing surfaces 26a and 27a of the lower replacement shoe engage the outer surface of anchor pin 13. With the replacement shoes thus positioned, the retainer is pivoted upwardly and the hook sections thereof are pried with a suitable tool into notches 32c and 33c of the upper replacement shoe. The replacement shoes, retracting pin and replacement spring will then be positioned, as shown in the drawings.

Retainer 17 may be formed of any material having a sufficient strength to bias the anchor pin ends of the brake shoes into firm engagement with the outer surfaces of anchor pins 12 and 13. Preferably, such member should be constructed of a corrosion-resistant material. In practice, it has been found that commercially available spring steel materials are suitable for this purpose.

It thus will be seen that the simplicity of design of the aforementioned brake assembly, and particularly the design of the retainer member therefor, provides for a reliable and effective performance of the assembly, and greatly facilitates the assembly and disassembly of the unit for maintenance and servicing requirements.

From the foregoing detailed description, it will be evident that there are a number of changes, adaptations and modifications of the present invention which come within the province of those persons having ordinary skill in the art to which the aforementioned invention pertains. However, it is intended that all such variations not departing from the spirit of the invention be considered as within the scope thereof as limited solely by the appended claims.

We claim:

1. A brake assembly for a vehicle axle having a beam comprising a spider mountable on said beam, a camshaft mounted on one end of said spider, a pair of anchor pins mounted on an opposite end of said spider, a pair of brake shoes, each of said brake shoes having at least one bearing surface disposed at one end thereof mounted on an outer portion of one of said anchor pins and a roller mounted on an opposite end thereof operatively engageable with said camshaft, a retainer encompassing the anchor pin ends of said brake shoes, biasingly urging the bearing surfaces of said brake shoes into engagement with said anchor pins, said retainer being a unitary construction and having a U-shaped configuration including a base section engaging an anchor pin end portion of one of said brake shoes, a pair of leg sections projecting from end portions of said base section toward the other of said brake shoes, and hook sections disposed at the free ends of said leg sections engaging the other of said brake shoes in hooking relation and a spring interconnecting said opposite ends of said brake shoes, pivotally biasing said opposite ends of said brake shoes toward each other into retracted positions.

2. A brake assembly according to claim 1 wherein said retainer comprises a spring element.

3. A brake assembly accordingly claim 1 wherein said retainer comprises a steel spring element.

4. A brake assembly according to claim 1 wherein the anchor pin ends of said brake shoes include recessed portions which receive said base and hook sections of said retainer.

5. A brake assembly according to claim 1 wherein portions of the leg sections of said retainer engage end portions of said anchor pins.

6. A brake assembly according to claim 5 wherein the leg sections of said retainer include arcuate portions disposed between said anchor pins.

7. A brake assembly according to claim 1 wherein the leg sections of said retainer include arcuate portions.

8. A brake assembly according to claim 1 wherein each of said brake shoes includes at least one rib section, a table section mounted on said table section, and wherein said rib section includes said bearing surface engageable with an anchor pin.

9. A brake assembly according to claim 8 wherein said rib section includes a recessed portion which receives a section of said retainer.

10. A brake assembly according to claim 8 wherein said retainer comprises a spring element.

11. A brake assembly according to claim 8 wherein said retainer comprises a steel spring element.

12. A brake assembly according to claim 8 wherein said retainer includes sections engaging end portions of said anchor pin.

13. A brake assembly according to claim 8 wherein said retainer includes sections disposed substantially in a plane including the axes of said anchor pins.

14. A brake assembly according to claim 1 wherein said retainer includes sections disposed substantially in a plane including the axes of said anchor pins.

15. A brake shoe for a brake assembly including a brake spider, a pair of anchor pins and a camshaft mounted on said brake spider, means for retaining lower portions of said brake shoe and a similar shoe on said anchor pins, said retainer being of a unitary construction and having a U-shaped configuration including a base section engaging an anchor pin end portion of one of said brake shoes, a pair of leg sections projecting from end portions of said base section toward the other of said brake shoes, and hook sections disposed at the free ends of said leg sections engaging the other of said brake shoes in hooking relation, and a retainer spring interconnectable relative to said brake shoes for biasing said brake shoes in retracted positions when mounted on said anchor pins, comprising a pair of rib sections, a table section mounted on said rib sections and at least one lining element mounted on said table section, each of said rib sections having a bearing surface engageable with one of said anchor pins when said brake shoe is mounted on said anchor pin, and each of said rib sections having a notched portion for receiving a section of said retainer means.

16. A brake shoe according to claim 15 wherein said notches are disposed in said rib sections at locations disposed between an anchor pin end of said lining element and said bearing surfaces of said rib sections.

17. A shoe according to claim 15 wherein said notches are formed in outer edges of said rib sections.

* * * * *